United States Patent
Davis

(10) Patent No.: US 9,921,106 B1
(45) Date of Patent: Mar. 20, 2018

(54) INTEGRATED IMAGING SPECTROMETER FOR HYPERSPECTRAL IMAGING SYSTEMS

(71) Applicant: Northrop Grumman Systems Corporation, Falls Church, VA (US)

(72) Inventor: Richard L. Davis, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/404,476

(22) Filed: Jan. 12, 2017

(51) Int. Cl.
*G01J 3/28* (2006.01)
*H04N 5/33* (2006.01)
*H04N 5/378* (2011.01)
*G01J 3/12* (2006.01)
*G01J 3/02* (2006.01)
*G02B 6/293* (2006.01)

(52) U.S. Cl.
CPC ............ *G01J 3/2823* (2013.01); *G01J 3/0218* (2013.01); *G01J 3/0259* (2013.01); *G01J 3/12* (2013.01); *G02B 6/29343* (2013.01); *H04N 5/332* (2013.01); *H04N 5/378* (2013.01); *G01J 2003/1213* (2013.01); *G01J 2003/2826* (2013.01)

(58) Field of Classification Search
CPC ...... G01J 3/2823; G01J 3/0259; G01J 3/0218; G01J 3/12; G01J 2003/2826; G01J 2003/1213; H04N 5/332; H04N 5/378; G02B 6/29343
See application file for complete search history.

(56) References Cited

U.S. PATENT DOCUMENTS

| 6,639,683 | B1 * | 10/2003 | Tumbar | G01J 9/02 356/494 |
|---|---|---|---|---|
| 8,018,597 | B2 | 9/2011 | Scott | |
| 9,182,648 | B2 | 11/2015 | Ai et al. | |
| 9,200,959 | B2 | 12/2015 | Khan et al. | |
| 2010/0110443 | A1 * | 5/2010 | Cheben | G01J 3/02 356/454 |

OTHER PUBLICATIONS

Nitkowski, A. et al; Sensing systems using chip-based spectrometers; In SPIE Defense+Security; pp. 908332-1 thru 908332-8; vol. 9083; International Society for Optics and Photonics, 2014.

(Continued)

*Primary Examiner* — Hwa Lee
(74) *Attorney, Agent, or Firm* — Patti & Malvone Law Group, LLC

(57) ABSTRACT

An integrated imaging spectrometer for hyperspectral imaging (HSI) system is disclosed. The integrated imaging spectrometer features photonic PLCs that include an array of input channel waveguides, one for each pixel of an image scene. Spectral grating filters are positioned along the length of each waveguide to extract the spectral components as the light propagates to the end of the waveguide. The filters route the optical energy to photodetectors and the detected electrical signals are captured by a read out integrated circuit (ROIC). Together the PLC, detectors, and ROIC form an imaging layer. Stacking imaging layers generates a device capable of recording an entire 3D high-resolution spatial/spectral image data cube in real-time.

14 Claims, 5 Drawing Sheets

(56) References Cited

OTHER PUBLICATIONS

Castro, J. M. et al; Optical add-drop multiplexers based on the antisymmetric waveguide Bragg grating; Applied optics; vol. 45, No. 6; Feb. 20, 2006; pp. 1236-1243; (2006).
Riziotis, C. et al; Performance comparison of Bragg grating-based optical add-drop multiplexers in WDM transmission systems; in IEEE Proceedings—Circuits, Devices and Systems, vol. 149, No. 3, pp. 179-186; 2002.
Kewitsch, A.S. et al; All-fiber zero-insertion-loss add-drop filter for wavelength-division multiplexing; Optics Letters; vol. 23, No. 2; Jan. 15, 1998; pp. 106-108; Optical Society of America (1998).

\* cited by examiner

INTEGRATED IMAGING SPECTROMETER FOR HYPERSPECTRAL IMAGING SYSTEMS

BACKGROUND

The invention relates generally to spectrometers and in particular, a grating-based, integrated photonic, staring hyperspectral imager (HSI).

Spectral imaging involves collecting information about an image from across the electromagnetic spectrum. In its simplest form, a multi spectral imager (MSI) collects image information in several spectral bands within a specific wavelength range, for example, a visible camera acquires images at red, green, and blue wavelengths. Improvements in many technical fields have made possible the collection of a wider range of wavelengths. Multispectral systems can now collect light from not only the visible spectrum, but also, for example, the infrared spectrum. In addition, the spectrum to be collected can be divided into many more spectral bands (typically ten or fewer for multispectral systems). Such systems have evolved from several spectral bands (multispectral) to hundreds of bands (hyperspectral) and will continue to evolve into even finer spectral "binning" (ultraspectral). These sensors provide high resolution spectral coverage of wavelength ranges spanning the visible and near infrared (VNIR), short-wave infrared (SWIR) and long-wave infrared (LWIR), and the latest developments in this area have led to very compact, modular high-performance systems.

Interest in HSI systems has rapidly increased. HSI systems have demonstrated the capability to remotely detect subtle spectral features in reflected and emitted energy from the earth's surface and atmosphere. These features allow detection, identification, and characterization of materials without the need to spatially resolve materials of interest. This capability has proven crucial to a number of remote sensing applications, from natural resource monitoring to detection of military targets.

Prior art grating spectrometers include pushbroom and whiskbroom scanners. In a pushbroom scanner, the image of the target area is collected one row of image pixels at a time. The light from the pixels is dispersed by a grating and projected onto a 2-dimensional focal plane array (FPA) of detectors. One dimension corresponds to the spatial position of the pixel and the other dimension corresponds to the spectral content of the pixel. One drawback of a pushbroom scanner is that it needs the platform's motion to scan the target area and therefore has a time dependence for obtaining the area data. The diffraction gratings, FPAs and associated optics result in HSIs that are large and heavy. They are vulnerable to scattered light effects. In addition, it is difficult to implement enhanced techniques such as Time Delay Integration (TDI) since that would require multiple copies of the entire spectrometer.

A Fourier Transform Spectrometer (FTS) is type of spectrometer that does not use dispersive elements. An FTS gathers full spectrum data at varying optical path lengths of the internal spectrometer optics, a process which requires scan mechanisms internal to the device. It then uses a Fourier transform to turn acquired data into an actual spectrum.

Thus, there is a need for HSIs with reduced mass and volume, improved minimization of scattered light and TDI operation that are capable of being rapidly and inexpensively produced in large quantities.

SUMMARY

The invention in one implementation encompasses an integrated hyperspectral imaging (HSI) spectrometer, which includes a lenslet array with one lens for each image pixel that couples light from a scene image to photonic lightwave circuits (PLCs) that comprise an array of input channel waveguides, one for each pixel of an image scene. Spectral grating filters are positioned along the length of each waveguide to extract the spectral components as the light propagates to the end of the waveguide. The filters route the optical energy to photodetectors and the detected electrical signals are captured by a read out integrated circuit (ROIC). The combination of PLC, detectors and ROIC form a spectrometer imaging layer. One imaging layer can perform the identical function of the pushbroom HSI system discussed above. Stacking multiple imaging layers generates a device capable of recording an entire 3D high-resolution spatial/spectral image data cube in real-time.

In an embodiment, the invention encompasses an integrated imaging spectrometer having front-end optics for receiving an image of a scene which has an input spectrum having a plurality of wavelengths; an array of lenslets for receiving the input spectrum; and a plurality of planar lightwave circuits, each planar lightwave circuit coupled to a row of lenslets in the array of lenslets.

In a further embodiment, each planar lightwave circuit of the integrated imaging spectrometer includes a plurality of waveguides, each waveguide coupled to one lenslet in the row; a plurality of filters along the length of the waveguide, each filter operatively coupled to a detector for detecting a unique wavelength from the input spectrum as filtered by the filter; and processing circuitry for processing the detected wavelength.

In further embodiments, at least one filter of the plurality of filters further comprises a grating assisted wavelength drop photonic filter or at least one filter further comprises a compound ring resonator.

In the further embodiments, the processing circuitry further comprises a readout integrated circuit (ROIC) or at least an analog-to-digital converter (ADC) or a multiplexer (MUX).

In a further embodiment, a plurality of additional integrated imaging spectrometers are concatenated to provide a wider field of view than that provided by a single imaging spectrometer.

In an alternative embodiment, an integrated hyperspectral imaging (HSI) spectrometer according to the invention includes front-end optics for receiving an image of scene comprising an input spectrum having a plurality of wavelengths; an array of lenslets for receiving the input spectrum; and a plurality of planar lightwave circuits, each planar lightwave circuit coupled to a row of lenslets in the array of lenslets, each planar lightwave circuit including a plurality of waveguides, each waveguide coupled to one lenslet in the row; a plurality of filters along the length of the waveguide, each filter operatively coupled to a detector for detecting a unique wavelength from the input spectrum as filtered by the filter; and processing circuitry for processing the detected wavelength.

In further embodiments, at least one filter of the plurality of filters further comprises a grating assisted wavelength drop photonic filter or a compound ring resonator.

In yet further embodiments, the processing circuitry further comprises a readout integrated circuit (ROTC) or at least an analog-to-digital converter (ADC) or a multiplexer (MUX).

In any of the above embodiments, the planar lightwave circuit further comprises a heterogeneously integrated wafer device.

DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

The inventive integrated imaging spectrometer combines wavelength selection and optical detection in an integrated package yielding substantial mass and volume reductions over standard imaging spectrometers. Instead of using diffraction gratings for wavelength selection, discrete focal plane arrays (FPAs) for detection, and scan optics to move the sensor's field-of-view (FOV) over a larger field-of-regard (FOR), the photonic spectrometer eliminates free-space and scan optics through the use of stacked photonic lightwave circuits (PLCs) that combine spectral selection and detection in one compact structure that can stare and acquire spatial/spectral information over large areas. This results in a dramatic reduction in mass and volume. Another benefit of lithographically patterned photonic waveguides fabricated at wafer scales is that ultimately these devices can be rapidly and inexpensively reproduced in large quantities.

A further advantage of the inventive integrated imaging spectrometer relative to conventional HSI systems is the use of Time Delay Integration (TDI), which is a data acquisition mode that enables multiple looks at the same ground spot leading to significant improvements in the instrument Signal-to-Noise Ratio (SNR). The integrated imaging spectrometer approach implements what is effectively a 3D focal plane with two dimensions available for spatial information and the third for spectral information.

Stray light is of concern in any optical instrument. Scattered light within the integrated imaging spectrometer fore-optic will not couple into the waveguide mode providing the instrument with natural inherent rejection of scattered light.

In addition, the photonic spectrometer architecture features a wavelength specific spectral filter per detector suppressing higher diffraction orders and scattered light. Another benefit of this architecture is that it eliminates spectrometer smile, an effect where the center wavelength of each spectral channel is a function of field angle.

Figure 1:
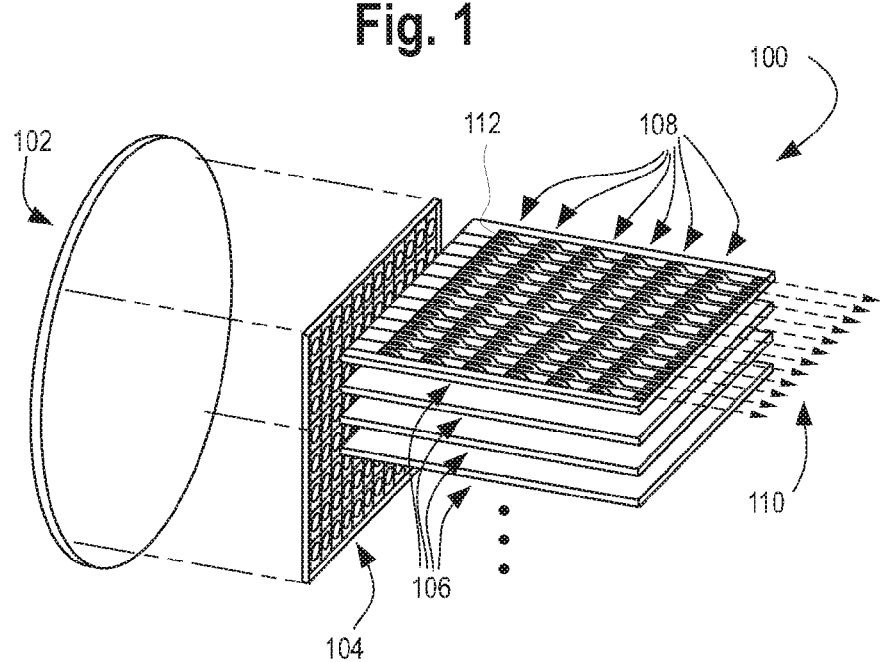
FIG. 1 depicts an integrated imaging spectrometer according to the present invention.

FIG. 1 shows an overview of an embodiment of the present invention, integrated imaging spectrometer 100. An image of a scene to be analyzed is formed in the image plane of conventional front end imaging optics 102, which could be, for example, a Cassegrain reflector or any other type of reflective optics. The scene image is projected onto a microlens array 104, a rectangular grid of lenslets, each of which corresponds to an image pixel, approximately 10 to 25 microns across. Each lenslet in a row of lenslets in array 104 focuses light from one pixel of the scene image onto the input face of a planar lightwave circuit (PLC) 106. The lenslet focal length is selected to efficiently couple the light from one image pixel to a separate waveguide 112 on each PLC 106 where the incoming image spectrum is decomposed by integrated filters 108, as explained in further detail below. A plurality of PLCs 106 are integrated with photodetectors and ROICs to form integrated imaging layers that are stacked as shown in FIG. 1 to accept the light from each row of image pixels. In an embodiment, integrated imaging spectrometer 100 is capable of nearly instantaneously forming an image cube for output 110 to further processing devices. In an embodiment, the image cube is approximately a 256×256 pixels or lenslets (spatial)×120 wavelengths (spectral)

Figure 2:
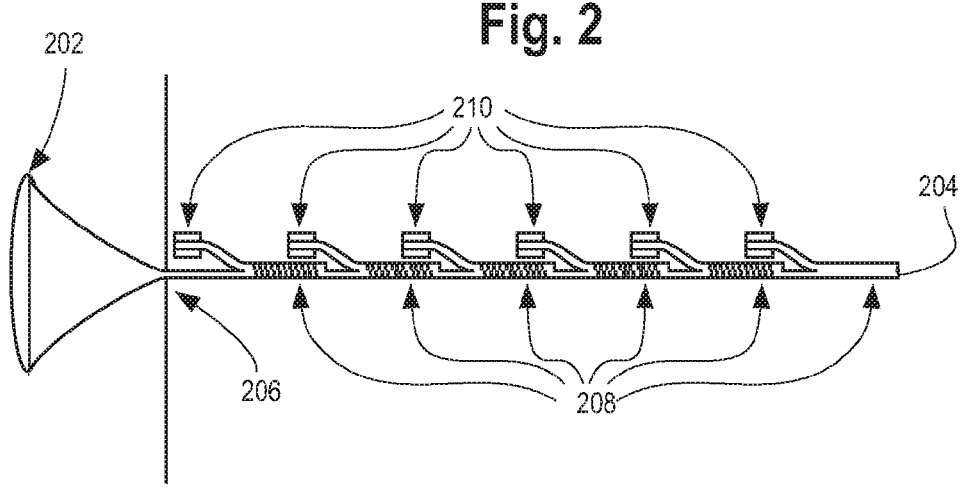
FIG. 2 depicts a schematic diagram of a single lenslet coupling light to an input channel waveguide with photonic filters of the integrated imaging spectrometer of FIG. 1.

A schematic diagram of one lenslet and its associated waveguide from FIG. 1 is shown in FIG. 2. Lenslet 202 receives a pixel of image spectrum and focuses it on one end 206 of waveguide 204. The entire image spectrum passes down the length of waveguide 204, with different individual wavelengths being filtered out by each filter 208 and sent to an associated photodetector 210. Although six filters are shown in FIG. 2, any number of filters could be used.

Figure 3:
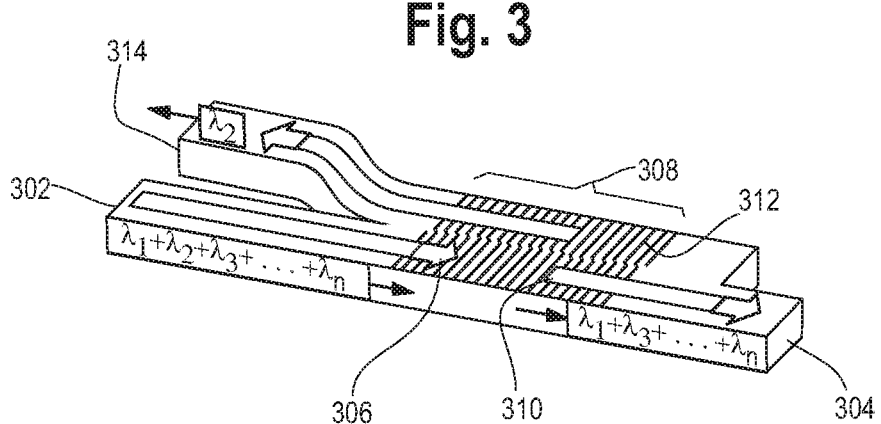
FIG. 3 depicts a more detailed view of the photonic filter of FIG. 2.

FIG. 3 depicts a grating assisted wavelength drop photonic filter 208 from FIG. 2 in more detail. A plurality of wavelengths, $\lambda_1$, $\lambda_2$, $\lambda_3$ through $\lambda_n$ enter the waveguide at 302 and travel through the waveguide to another filter or the end of the waveguide 304 as shown by arrow 306. Filter 308 is a set of two offset gratings 310 and 312 which are designed to extract an incident wavelength (e.g. $\lambda_2$) which matches the grating phase-matching condition. The selected wavelength exits the waveguide at 314 where it is detected by detector 210 of FIG. 2.

In an embodiment, the filters are based on grating-assisted mode conversion and backward coupling in the waist of an adiabatically-merged pair of dissimilar waveguides. The grating periodicity, strength and interaction length control the center wavelength, reflectivity and bandwidth of the filter. Each filter along the length of a waveguide extracts a different wavelength. Additionally the shape of the reflection band can be tailored by weighting the grating's coupling strength along its length. In an embodiment, the spectrometer's waveguides and photonic filters use $SiO_2$-based waveguide technologies. After the last filter along a waveguide, any remaining input spectrum would, for example, exit the device or enter an absorber.

Typically the filters would be designed to provide 5 nm wide spectral bins throughout the visible and near infrared spectrum. The interaction lengths of the grating filters would then range from about 100 μm to 300 μm. This allows the fabrication of 120 filters on less than two inches of waveguide length. The inventive approach using channel waveguides and photonic filters can be extended to the longer wavelength bands as the optoelectronic integration technologies evolve. Examples of how this may be done are discussed below. At longer wavelengths ($\lambda$>2.5 µm) an alternative filter approach may be required. This is due to the fact that the grating length scales with $\lambda^2$ resulting in overly long configurations.

Figure 4A:
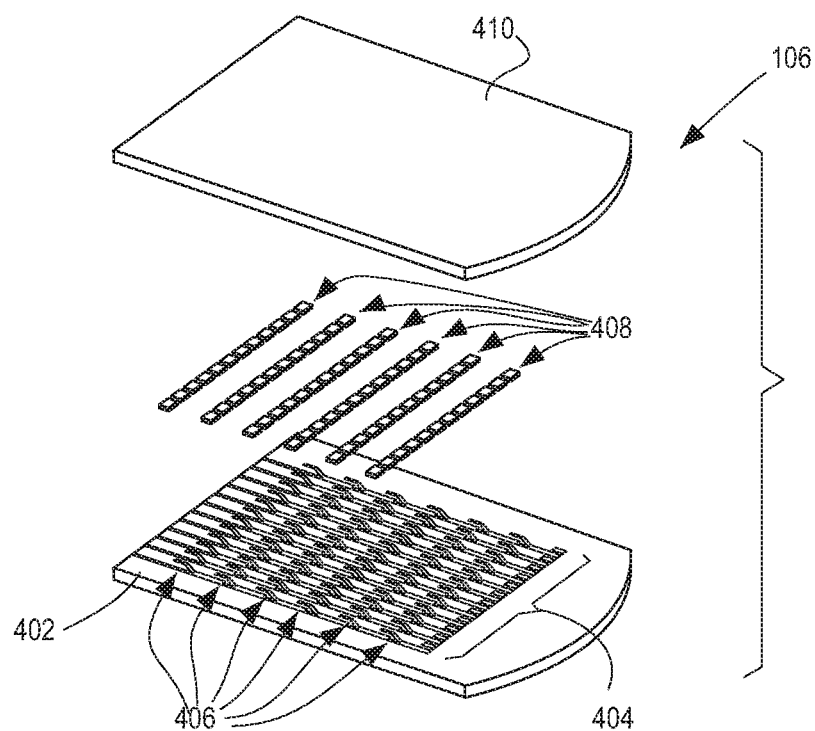
FIG. 4A depicts a more detailed view of the assemblage of an imaging layer of FIG. 1.

A more detailed view of PLC 106 of FIG. 1 is shown in FIG. 4A. Substrate 402 includes a set of input channel waveguides 404 that accept the light collected from pixels in the image plane of the front-end optics 102 and micro-lens array 104 of FIG. 1. Every pixel in the image is coupled to a separate input waveguide 404. Each of waveguides 404 will have a series of spectral filters 406 to extract the spectral components as the light propagates to the end of the spectrometer chip. The filters are explained in terms of filtering in the visible (vis) wavelength and short wavelength infrared (SWIR) regions but any region of spectrum could be filtered depending on the availability of compatible materials technologies.

Photonic filters 406 decompose each pixel's spectral content and couple the spectral components to individual photodetectors 408 that are heterogeneously integrated in the waveguide substrate 402. The material base for detectors 408 is chosen to optimize responsivity for the range of wavelengths being detected. In an embodiment, a single integrated imaging spectrometer covers multiple optical bands, or wavelengths. This embodiment uses several distinct detector materials that are integrated into a single spectrometer to optimize responsivity across the entire range of optical bands. As noted above, any range and number of optical bands can be filtered and detected depending on design needs.

The outputs of detectors 408 are transferred to the ROIC wafer 410 that contains on-chip circuitry that can be used to perform such pre-processing tasks as gain and offset correction, background subtraction, or the subtraction of unusable spectral bands and then transfer the data to the output of the chip, typically electrical contact pads at the edge of the chip. The electronic signals can then be transmitted to an image processor to perform the operations that are required for typical HSI (hyperspectral imaging) algorithms. In an embodiment, substrate 402 is a wafer that is manufactured with one or a plurality of waveguide areas 404. In a further embodiment, the area forming waveguides 404 is approximately 1 inch by 4 inches long. The fabrication of the components of FIG. 4A may use a variety of semiconductor fabrication techniques, including, for example, heterogeneous integration technology.

Figure 4B:
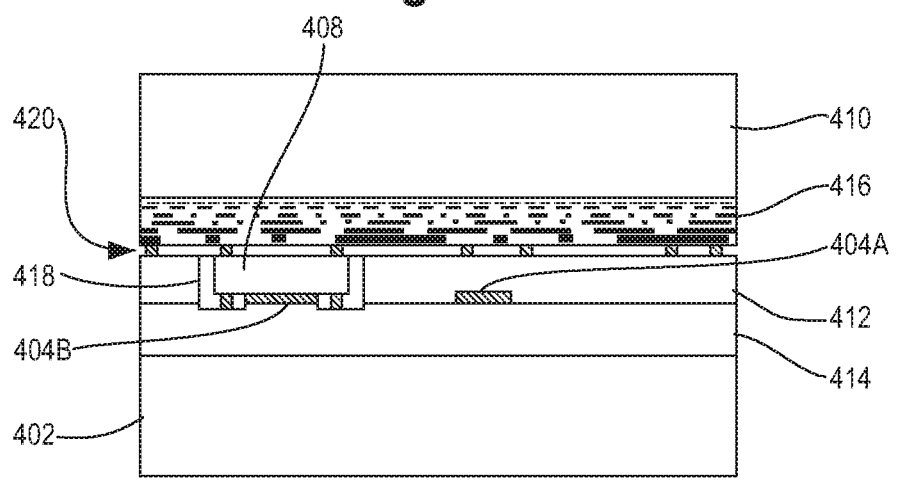
FIG. 4B depicts a cross sectional view of an assembled imaging layer of FIG. 4A.

FIG. 4B shows a side cross-sectional view of one waveguide 404 of the PLC of FIG. 4A. Substrate 402 is preferably made of silicon but any suitable material could be used. In an embodiment, substrate 402 is approximately 25 µm thick. Waveguide 404 is surrounded by upper waveguide cladding 412 and lower waveguide cladding 414. In an embodiment, each of claddings 412 and 414 are made from silicon dioxide and are approximately 5-10 µm thick.

An input spectrum enters waveguide 404A from an individual micro-lens of micro-lens array 104 of FIG. 1. A filter (308 in FIG. 3) couples a prescribed portion of the input spectrum to waveguide 404B which is then directed to a detector 408. A cavity 418 is etched in upper cladding 412 so detector 408 can be connected to waveguide 404B.

Detector 408 transfers the detected wavelength to circuitry in layer 416 that has been fabricated on substrate 410. In an embodiment, substrate 410 is approximately 48 µm thick and is made of silicon while layer 416 is approximately 10 µm thick and is fabricated using complementary metal-oxide-semiconductor (CMOS) technology but any preferred fabrication technique could be used. The circuitry in layer 416 includes any circuitry required to further process the data from detector 408, for example a Readout Integrated Circuit (ROIC), Analog-to-Digital Converter (ADC), multiplexers (MUX), etc. Gap 420 includes a number of solder balls/bumps/wiring as shown for connecting elements in layer 416 to each other and to detector 408. In an embodiment, the layers of FIG. 4B are heterogeneously integrated.

Figure 5A:
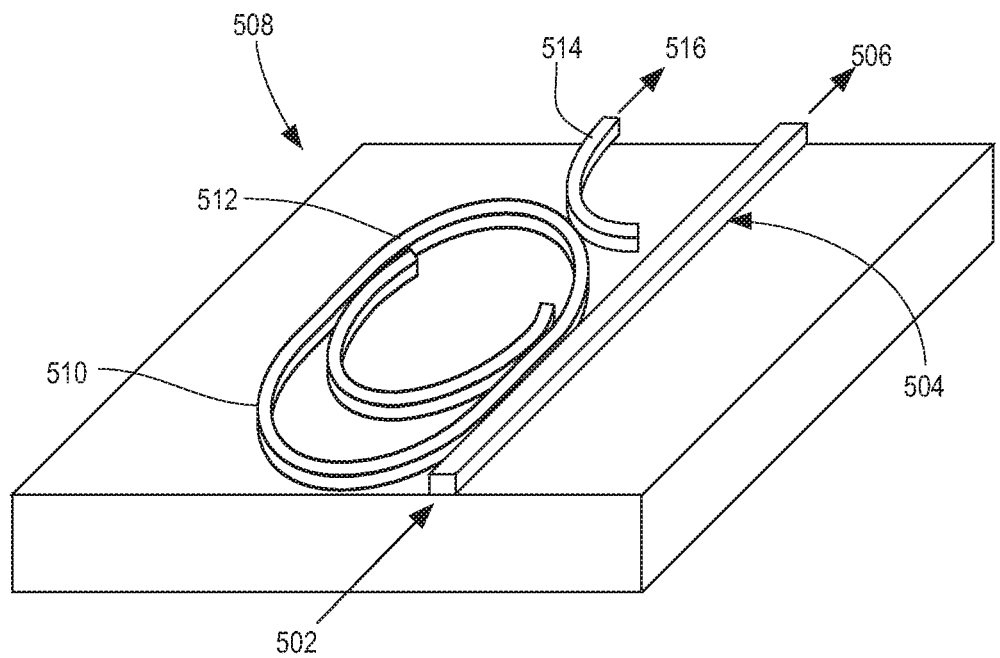
FIG. 5A depicts an alternative embodiment of a photonic filter.

The filter described above in connection with FIG. 3 is most effective for visible and SWIR wavelengths. An alternative embodiment for spectral filters in the mid- and long-wavelength infrared is illustrated in FIG. 5A where the filter consists of a compound ring resonator. A compound ring resonator is employed to insure that the filter has sufficient free spectral range for the wavelength band of interest. As an example, this type of filter operating in the 12 µm to 18 µm wavelength range would occupy an area of approximately 100 µm×100 µm, leading to a 256×256×200 element spectrometer that is only slightly larger than the visible-wavelength instrument discussed above.

Referring to FIG. 5A, input spectrum 502 enters waveguide 504, passes through and exits at 506, either to the next filter or to an absorber or other device as explained above for FIG. 3. The compound ring resonator 508 includes an outer ring 510 and an inner ring 512. In operation, outer ring is designed to have a circumference equal to a multiple of wavelength $\lambda_n$ being filtered. Each ring along the length of a waveguide 504 will have a different circumference. In operation, input spectrum from waveguide 504 leaks into outer ring 510. Due to the circumference of ring 510, in a short amount of time, resonance causes the entire content of the target wavelength, $\lambda_n$, to be drawn away from waveguide 504 into outer ring 510.

Figure 5B:
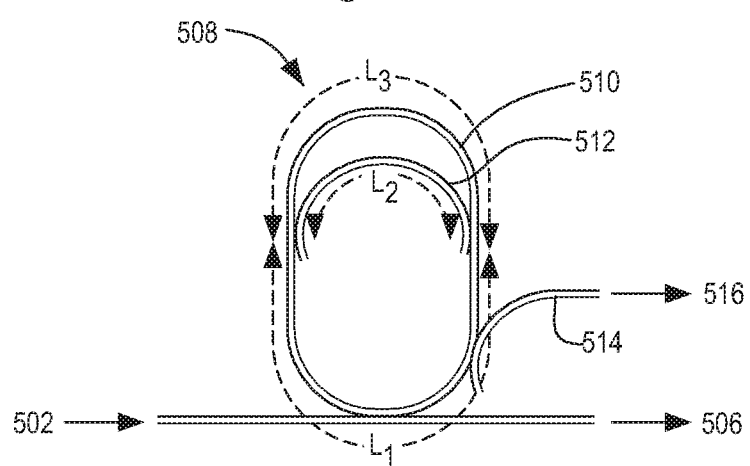
FIG. 5B depicts a schematic top view of the filter of FIG. 5A.

The operation of the filter of FIG. 5A is described in connection with the schematic diagram of FIG. 5B. A single ring resonator 510 may not have sufficient Free Spectral Range (FSR) to filter a single wavelength $\lambda_n$. This is due to the fact that, although outer ring 510 is only intended to resonate with a single wavelength of interest, other wavelengths at integer multiples, $\lambda_{n+x}$, $\lambda_{n+2x}$, $\lambda_{n+3x}$, etc, will also resonate in outer ring 510. This situation is addressed with inner ring 512, which is designed to suppress resonances from undesired wavelengths. The compound ring resonator 508 filters only those wavelengths that simultaneously resonate in both the outer ring, shown in FIG. 5B as $L_1+L_2$ and the inner ring, shown as $L_1+L_3$.

Once a resonance is established, the filter wavelength, $\lambda_n$, is extracted by tap 514, exits in the direction of arrow 516 and is sent to a detector similar to that of detector 408 of FIG. 4B.

Figure 6:
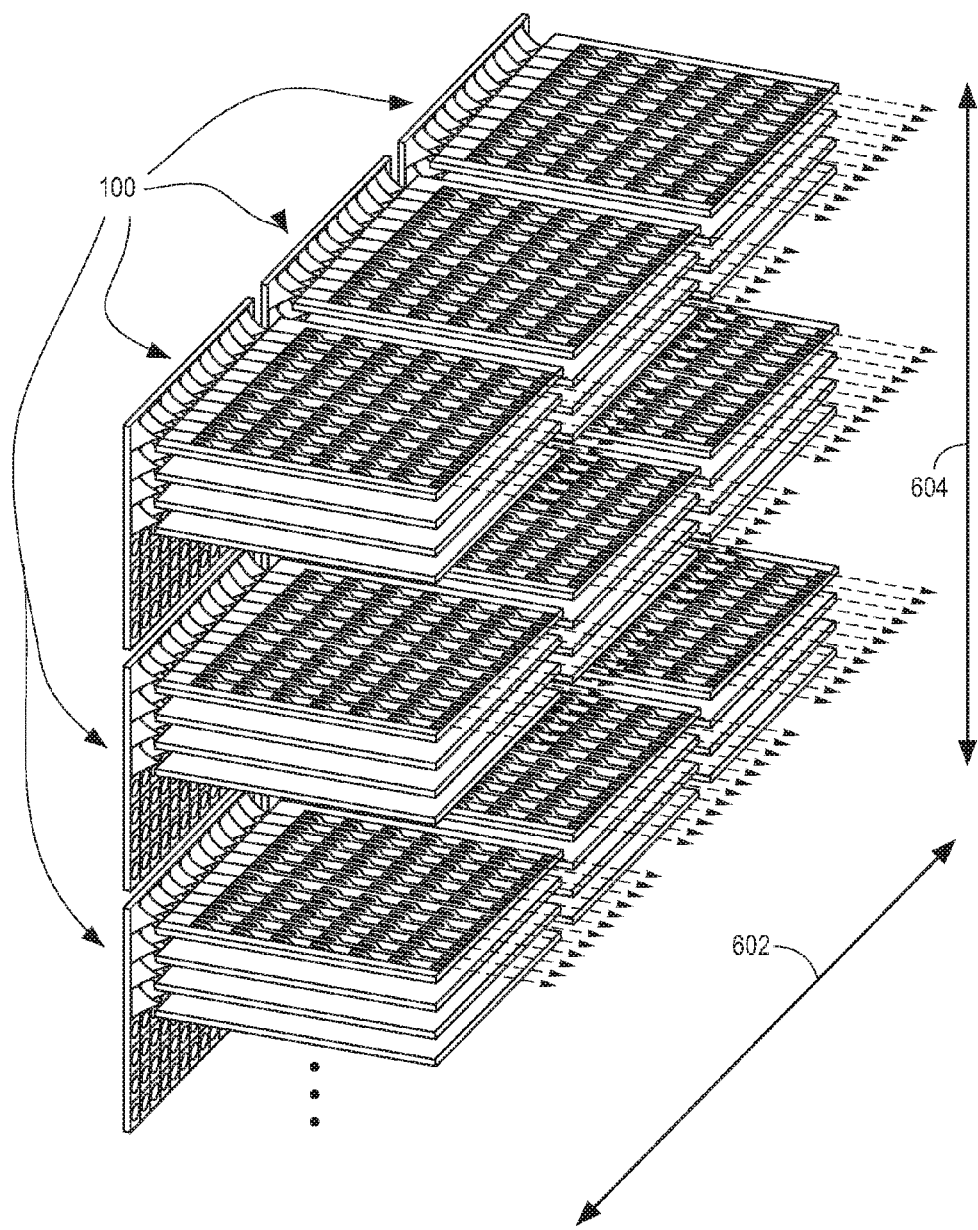
FIG. 6 depicts the apparatus of FIG. 1 arranged to provide a larger field-of-view coverage.

Integrated imaging spectrometer 100 of FIG. 1 can be concatenated tiled, as shown in FIG. 6, to provide a wide field-of-view coverage. The combined spectrometers 100 increase both the field of view in both the x-dimension 602 that forms the "cross track" of the image and the y-dimension 604 forms the "in-track" portion. For example, a satellite moving east to west would constitute the "in track" direction while the field of view north and south of the satellite would constitute the "cross track" direction.

The apparatus 100 in one example comprises a plurality of components such as one or more of electronic components, hardware components, and computer software components. A number of such components can be combined or divided in the apparatus 100.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An integrated imaging spectrometer, comprising:
   front-end optics for receiving an image of a scene, said image comprising an input spectrum having a plurality of wavelengths;
   an array of lenslets for receiving the input spectrum; and
   a plurality of planar lightwave circuits, each planar lightwave circuit coupled to a row of lenslets in the array of lenslets,
   wherein each planar lightwave circuit further comprises:
      a plurality of waveguides, each waveguide coupled to one lenslet in the row;
      a plurality of filters along the length of the waveguides, each filter operatively coupled to a detector for detecting a unique wavelength from the input spectrum as filtered by the filter; and
      processing circuitry for processing the detected wavelength.

2. The imaging spectrometer of claim 1, wherein at least one filter of the plurality of filters further comprises a grating assisted wavelength drop photonic filter.

3. The imaging spectrometer of claim 1, wherein at least one filter further comprises a compound ring resonator.

4. The imaging spectrometer of claim 1, wherein the processing circuitry further comprises a readout integrated circuit (ROIC).

5. The imaging spectrometer of claim 1, wherein the processing circuitry further comprises at least an analog-to-digital converter (ADC) or a multiplexer (MUX).

6. The imaging spectrometer of claim 1, wherein the planar lightwave circuit further comprises a heterogeneously integrated wafer device.

7. The imaging spectrometer of claim 1, further comprising a plurality of additional integrated imaging spectrometers concatenated to provide a wider field of view than that provided by a single imaging spectrometer.

8. An integrated hyperspectral imaging (HSI) spectrometer, comprising:
   front-end optics for receiving an image of scene comprising an input spectrum having a plurality of wavelengths;
   an array of lenslets for receiving the input spectrum; and
   a plurality of planar lightwave circuits, each planar lightwave circuit coupled to a row of lenslets in the array of lenslets, each planar lightwave circuit further comprising
      a plurality of waveguides, each waveguide coupled to one lenslet in the row;
      a plurality of filters along the length of the waveguide, each filter operatively coupled to a detector for detecting a unique wavelength from the input spectrum as filtered by the filter; and
      processing circuitry for processing the detected wavelength.

9. The HSI spectrometer of claim 8, wherein at least one filter of the plurality of filters further comprises a grating assisted wavelength drop photonic filter.

10. The HSI spectrometer of claim 8, wherein at least one filter further comprises a compound ring resonator.

11. The HSI spectrometer of claim 8, wherein the processing circuitry further comprises a readout integrated circuit (ROIC).

12. The HSI spectrometer of claim 8, wherein the processing circuitry further comprises at least an analog-to-digital converter (ADC) or a multiplexer (MUX).

13. The HSI spectrometer of claim 8, wherein the planar lightwave circuit further comprises a heterogeneously integrated wafer device.

14. The HSI spectrometer of claim 8, further comprising a plurality of additional integrated hyperspectral imaging spectrometers concatenated to provide a wider field of view than that provided by a single integrated hyperspectral imaging spectrometer.

* * * * *